United States Patent

[11] 3,557,314

[72] Inventor Michel L. Avignon
Neuilly, France
[21] Appl. No. 697,061
[22] Filed Jan. 11, 1968
[45] Patented Jan. 19, 1971
[73] Assignee International Standard Electric Corporation
New York, N.Y.
a corporation of Delaware
[32] Priority Jan. 11, 1967
[33] France
[31] 92070

[54] FRAME SYNCHRONIZATION CIRCUIT

6 Claims, 8 Drawing Figs.

[52] U.S. Cl. .......... 179/15, 178/69.5
[51] Int. Cl. .......... H04j 3/06
[50] Field of Search .......... 179/15A, 15AT, 15sync; 178/69.5

[56] References Cited
UNITED STATES PATENTS

| | | | |
|---|---|---|---|
| 3,144,515 | 8/1964 | Kaneko | 179/15 |
| 3,274,339 | 9/1966 | Herry | 179/15 |
| 3,454,722 | 7/1969 | Jousset | 179/15 |

*Primary Examiner*—Ralph D. Blakeslee
*Attorneys*—C. Cornell Remsen, Jr., Rayson P. Morris, Percy P. Lantzy, Philip M. Bolton and Isidore Togut

ABSTRACT: The framing code of a time division multiplex digital data is compared cyclically with the local framing timing signals. When the comparison results in an out-of-frame condition, this condition is stored in a flip-flop and the results of the preceding *j* comparisons are stored in a *j*-stage shift register. A framing error signal is produced when the flip-flop and any *k* stages of the shift register simultaneously indicate an out-of-frame condition. This error signal shifts the relative timing of the data and timing signals until an in-frame condition is produced by the comparison to inhibit the error signal.

Inventor
MICHEL L. AVIGNON
By Alfred C. Hill
Agent

INVENTOR
MICHEL L. AVIGNON
BY Alfred C. Hill
AGENT

FRAME SYNCHRONIZATION CIRCUIT

BACKGROUND OF THE INVENTION

This invention relates to a time division multiplex digital data PCM (pulse code modulation) communications system, and more particularly, to a frame synchronizing circuit which may be used either in a terminal station of a transmission system, or in a telephone central exchange.

Frame synchronization circuits have been described in the following patent applications:

a. Copending U.S. Pat. application of M. J. Herry and J. L. R. Jamet (case 2-1), Ser. No. 621,691, filed Mar. 8, 1967; and b. Copending U.S. Pat. application of M. L. Avignon and A. E. J. Chatelon (case 8—22), Ser. No. 688,522, filed Dec. 6, 1967.

The invention of the copending application (a) cited above concerns a framing circuit for PCM telephone central exchange while the invention of the above cited copending application (b) relates to a framing circuit for a bidirectional PCM transmission system.

For purposes of explaining the operation of the prior art frame synchronization circuit and the frame synchronization circuit of the present application, it will be assumed, by way of an example, that the PCM system has the following characteristics;

1. Frame period or cycle $Tr$ equals 125 microseconds;

2. The number of channels per trunk $m$=24. The 23 first channels are reserved to the transmission of code messages concerning communications and the 24th channel is reserved to the transmission of a framing coding CSy;

3. The number of binary digits constituting the message transmitted over one channel $p$=8; and 4. A pulse is transmitted when the corresponding digit is in the 1 condition.

The transmission of messages between two terminals A and B is carried out over one trunk which comprises two transmission lines reserved, respectively, for the transmission from terminal A to terminal B and for the transmission from terminal B to terminal A.

When message signals are transmitted from terminal B towards terminal A, they are controlled by clock signals generated in terminal B which constitute a time scale which is not in synchronism with the time scale HC of terminal A. Besides, the time position of these message signals is submitted to fluctuations due to variations in the propagation conditions, so that the time scale HJ, controlling the signals received at terminal D, does not present usually any direct correlation with the time scale HC.

In a time division multiplex system, there must be achieved, in station A, either a demultiplexing of the channels in the case of bidirectional transmission systems, or an interconnection of the channels belonging to different trunks. Both these operations require that a time scale HK, delivering signals identifying the received messages, be available, and that one of these identification signals, reference V24, being generated during the time reserved to the reception of the framing code CSy transmitted over the 24the channel.

More precisely, the eight digit time slots $t1$ to $t8$ of the time V24 must correspond to the eight digits of the framing code CSy received in series form. In order to assure this coincidence, each of the copending applications mentioned hereinabove comprises the following circuits:

1. A circuit controlling synchronization of the message signals, each one of these signals coincides with one of the digit time slot signals of the time scale HC. This is carried out by controlling the phase shift between the time scales HJ and HC by means of a phase corrector which employs a variable delay line; and 2. A frame synchronization circuit which controls the exact coincidence of the time of reception of the framing code CSy with the time of generation of the signal V24.

In order to assure this framing, a check is made whether the framing code CSy is effectively received during the time V24. If the framing code is not received as required, a search for the framing code CSy is carried out by examining all the possible groups constituted by $p$ successive digits received from terminal B. According to the process used, the maximum duration of this search is of one cycle (fast search mode as described in the copending application (a)), or of $m \times p$ cycles (slow search mode of the circuit described in the copending application (b)). When, in the course of a search, $p$ successive digits are found corresponding to the framing code CSy, a check is made during three successive cycles to determine whether these digits correspond effectively to the framing code, and if this check is not successful the search is resumed.

In the PCM system defined hereinabove, if it is assumed that a central exchange includes 50 trunks, the maximum duration of a slow search is $m \times p$ cycles per trunk, another words, a duration lower than 1 second for assuring the frame synchronization of all the trunks by a cyclic scanning.

It is thus seen that the slow search mode is acceptable even for a PM central exchange, since deframing occurs very scarcely during normal operation in the course of which the framing circuit is used by each trunk for only a few cycles.

SUMMARY OF THE INVENTION

An object of the present invention is to provide an improved frame synchronization circuit for a PCM time division multiplex communication system.

Another object of the present invention is the provision of a frame synchronization circuit which employs the slow search process and which presents the advantage of using a check algorithm more elaborate than the circuits mentioned hereinabove in the copending applications and which, in the case of a PCM central exchange may be connected to the trunks by means of a few conductors only.

In accordance with the principles of this invention the checking process used consists in examining the codes received in the time V24 during $j+1$ successive cycles and in generating an out-of-frame signal only if $k$ errors have been detected during this time interval, where $j$ is an integer greater than one and $k$ is an integer equal to or between 1 and $j$.

In the description to follow of the preferred embodiment of the present invention, it is assumed that $j = 4$ and $k = 3$. This arrangement avoids the start of a framing code search in the case of a transient disturbance of the framing code.

A feature of the present invention is the provision of a frame synchronization circuit for a time division multiplex digital data communication system comprising: a first source of received time division multiplex digital data including a framing signal; a second source of local timing signals during which the framing signal should be received; first means coupled to the first and second sources for periodic comparison of the framing signal and the local timing signals to produce a control signal having an in-frame condition and an out-of-frame condition; second means coupled to the first means to store the control signal resulting from a given plurality of the comparisons; third means coupled to the second means responsive to the simultaneous presence of a given number of the out-of-frame conditions of the control signal less than the given plurality of the comparisons to produce a framing error signal; and fourth means coupled to the third means and at least one for the first and second sources responsive to the framing error signal to adjust the relative timing of the received data and the local timing signals until the first means produces the control signal having the in-frame condition which enables the disabling of the second and third means.

Another feature of the present invention is characterized by the fact that when it is detected that the framing code is not received during the channel time V24 reserved to it, is in then checked whether this out-of-framing condition reappears during $k$ out of the $j$ following cycles in order to decide whether the trunk is deframed or not. In the first case, there is a shifting by one digit time slot of the time position of the message signals or the local timing signal V24, this operation being performed in a repetitive manner during each cycle as long as the trunk is deframed according to the hereinabove criterion.

BRIEF DESCRIPTION OF THE DRAWING

The above mentioned and other features and objects of this invention will become more apparent by reference to the following description taken in conjunction with the accompanying drawings, in which.

DESCRIPTION OF THE PREFERRED EMBODIMENT

Before describing the invention, logical algebra notations that will be used herein in order to simplify the description of the logical operations will be described. The subject is treated extensively in numerous papers and in particular in the book "Logical Design of Digital Computers" by M. Phister (J. Wiley, publisher).

Thus, if a condition characterized by the presence of a signal is written A, the condition characterized by the absence of said signal will be written $\bar{A}$.

These two conditions are linked by the well known logical relation $A \times \bar{A} = 0$ in which the sign *x* is the symbol of the coincidence logical function or AND function.

If a condition C appears only if the conditions A and B are simultaneously present, the logical function is A × B = C and this function may be carried out by means of a coincidence or AND gate.

If a condition C appears when at least one of two conditions E and F is present, the logical function E + F = C and this function is carried out by means of a mixing gate or OR gate.

Figure 1A:
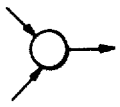
FIGS. 1*a* to 1*f* illustrate a number of symbols of logic circuitry employed in FIG. 2.
Figure 1B:
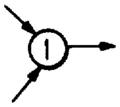
Figure 1C:
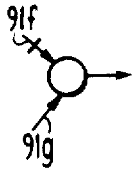
Figure 1D:
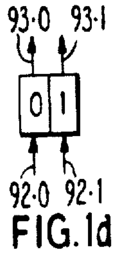
Figure 1E:
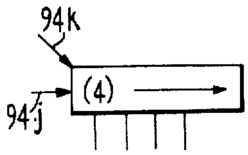
Figure 1F:
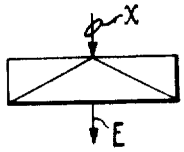

Referring to FIGS. 1*a* to 1*f*, logic symbols employed in FIG. 2 will be described. FIG. 1*a* represents simple AND gate. FIG. 1*b* represents a simple OR gate. FIG. 1*c* represents an INHIBIT gate having two input terminals 91*f*, 91*g* and which is blocked when a signal is applied over the inhibit input 91*f*. FIG. 1*d* represents a bistable circuit or "flip-flop" to which a control signal is applied over one of its input terminals 92 – 1 or 92 – 0 in order to set it in the 1 state or to reset it in the 0 state. A voltage of same polarity as that of the control signal is present, either on the output 93 – 1 when the flip-flop is in the 1 state, or on the output 93 – 0 when it is in the 0 state. If the flip-flop is referenced B1, the logical condition which characterized the fact that it is in the 1 state will be written B1 and that characterizing the fact that it is in the 0 state will be written B1. FIG. 1*e* represents a shift register having a four bit capacity. It receives its input and advance signals, respectively, on terminals 94*j* and 94*k*. FIG. 1*f* represents a decoder which delivers a signal on its terminal E when the proper code is applied to its input terminals.

Figure 2:
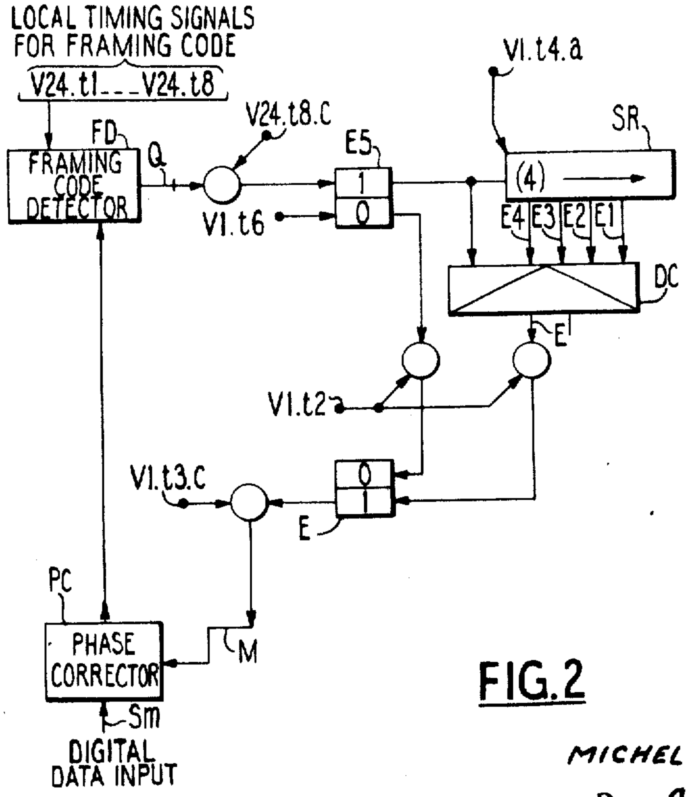
FIG. 2 illustrates a block diagram of the frame synchronization circuit in accordance with the principles of the present invention.
Figure 3:
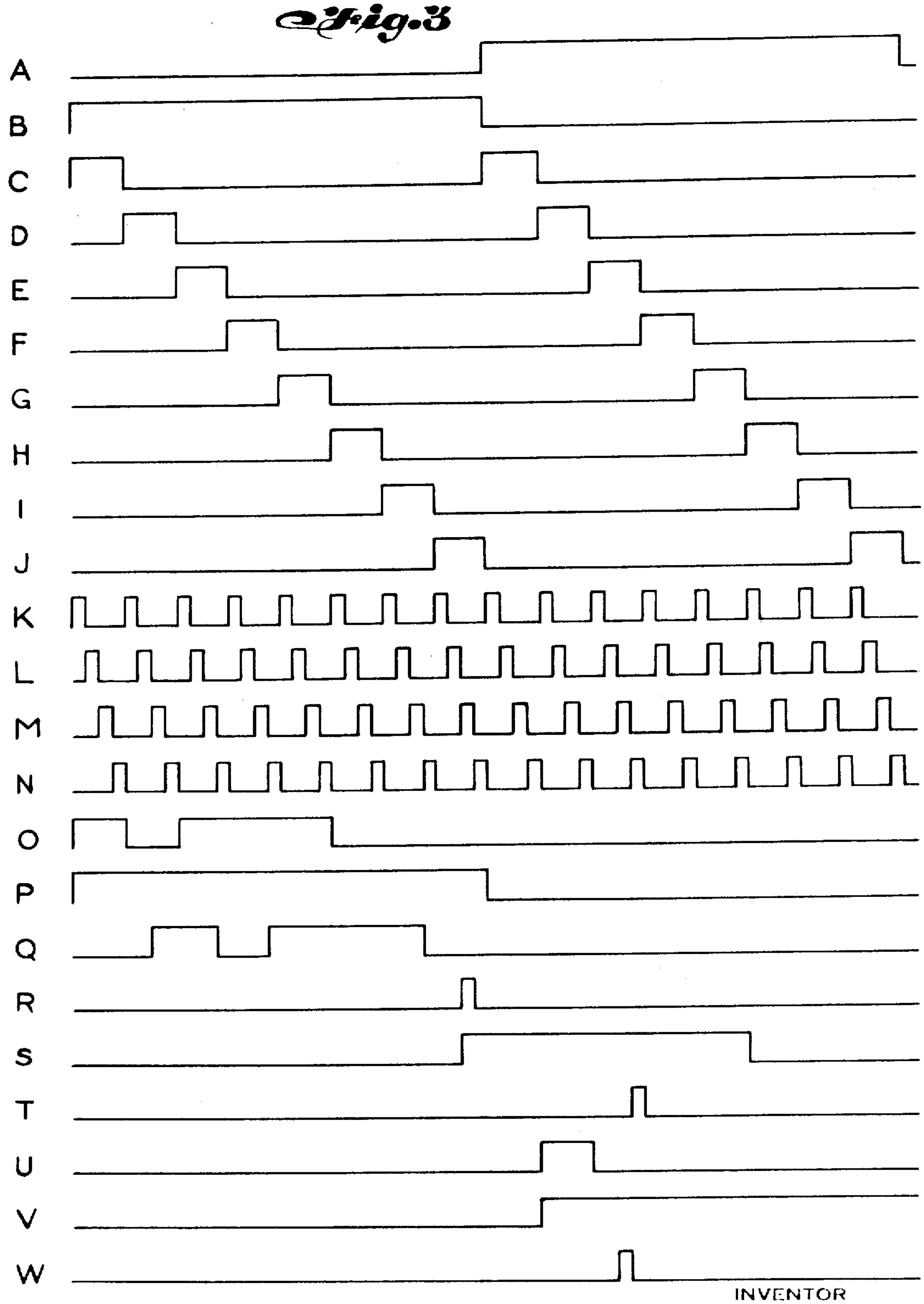
FIG. 3 is a timing diagram useful in illustrating the operation of FIG. 2.

FIG. 2 is a block diagram of the frame synchronization circuit according to the principles of the present invention. The following clock signals are utilized in this circuit: (1) The channel time slot signals V24 (Curve B, FIG. 3) and VI (Curve A, FIG. 3); (2) Some of the digit time slots signals tl, t2...t8 (Curves C—J, FIG. 3); and (3) The basic time slot signals *a, b, c, d* (Curves K—N, FIG. 3) which divide each digit time slot into four intervals of equal duration. All of these timing signals are delivered by a clock of well known design (not shown).

In order to simplify the presentation in FIG. 2, a logical condition V24 × *t*8 × *c* will be shown symbolically by the signal V24.*t*8.c applied to one input of the logic circuit.

The frame synchronization circuit comprises: (1) framing code detector FD which delivers a signal Q when the code received during the time interval V24.*t*1 to V24.*t*8 is the framing code CS*y*. Such a circuit has been described in the above cited copending application (b); (2) the circuits assuring the counting of the errors which comprise flip-flop E5, shift register SR having a capacity of four digits and decoder DC. If, by way of a nonlimitating example, *j* = 4 and *k* = 3, decoder DC delivers a signal E' for the logical condition: E' = (E1 × E2 + E1 × E3 + E1 × E4 + E2 × E3 + E2 × E4 + E3 × E4) × E5, referred to hereinafter as logical equation (1); and (3) flip-flop E which controls the search for framing code CS*y*.

The operation of this circuit will be described by assuming that each message signal is received on input S*m* at the basic time slot *b*, and, initially, flip-flop E is in the 0 state.

At the time V24.*t*8.c, circuit FD delivers signal Q, (Curve P, FIG. 3), if the code received in V24 is actually the framing code CS*y*, and, in the opposite case (Curve Q, FIG. 3), i.e., when in an out-of-frame condition, the logical condition $\bar{Q}$× V24.*t*8. (Curve R, FIG. 3) controls the setting to the 1 state of flip-flop E5 (Curve S, FIG. 3) which had been reset to the 0 state at time V1.*t*6 of the same cycle. If it is assumed that less than two flip-flops are in the 1 state in register SR, the logical equation (1) is not satisfied and the state of the flip-flop is not modified in V1.*t*2 of the next cycle. At time V1.*t*4.*a*, an advance signal (Curve T, FIG. 3) applied to register SR controls the transfer of the state of flip-flops E5 into the first stage of shift register SR. Thus, a signal appears on its output E4 at the beginning of the time V1.*t*4 and at time V1.*t*6, flip-flop E5 is reset to the 0 state.

This succession of operations is present in each cycle, the information being shifted each time in register SR by one position towards the right. If the errors repeat and the logical equation (1) is satisfied the logical condition E' × V1.*t*2 (curve U, FIG. 3) controls the setting to the 1 state of slip-flop E (curve V, FIG. 3). The logical condition E × V1.*t*3.*c* controls the generation of a signal M (curve W, FIG. 3) of a duration of one basic time slot which controls a shift by one digit time slot of the relative position of the signals S*m* and V24, this operation constituting a step in the search of the framing code CS*y*. In a bidirectional PCM transmission system, such as described in the above cited copending application (b), the time scale of terminal B is locked to the time scale HC, so that the time positions of the framing code CS*y* and the signal V24 cannot be very distant one from the other and their phase difference is lower than the capacity of the phase corrector PC comprising a variable time delay circuit in the form of a shift register controlled by a reversible or bidirectional ring counter which is under control of signal M. Each signal M controls then an advance by one digit time slot of the reading time of the received data signals in phase corrector PC.

In a PCM telephone central exchange, the time scale HJ is completely independent of the time scale HC and each signal M must control a lead or lag correction of one digit time slot of the time position of the signals of the time scale HK (channel time slot signals V1, V2...V24).

As it has been seen previously, flip-flop E5 is set to the 0 state at each time V1.*t*6 and if, at the time V1.*t*2 of the next cycle it is still in this state, i.e., if the framing code CSy has coincided with the time V24, flip-flop E is reset to the 0 state.

It is thus seen that, as long as equation (1) is satisfied, the input data is shifted by one digit time slot at each cycle and that, in the opposite case, there is not shifting at all.

When, after a certain number of shiftings, the framing condition Q appears, flip-flop E5 remains in the 0 state and the equation (1) is no longer satisfied but one or two of the flip-flops of register SR are still in the 1 state. At the next cycles, the input data is not longer shifted if equation (1) is no longer satisified and, after a maximal delay of four cycles, register SR is cleared.

When a signal $\bar{Q}$ appears alone, it is seen that it cannot start a search and that the corresponding error signal is suppressed at the fifth cycle.

While I have described above the principles of my invention in connection with specific apparatus, it is to be clearly understood that this description is made only by way of example and not as a limitation to the scope of my invention as set forth in the objects thereof and in the accompanying claims.

I claim:

1. A frame synchronization circuit for a time division multiplex digital data communication system comprising:
 a first source of received time division multiplex digital data including a framing signal;
 a second source of local timing signals during which said framing signal should be received;
 first means coupled to said first and second sources for periodic comparison of said framing signal and said local timing signals to produce a control signal having an in-frame condition and an out-of-frame condition;
 second means coupled to said first means to store said control signal resulting from a given plurality of said comparisons;
 third means coupled to said second means responsive to the simultaneous presence of a given number of said out-of-frame conditions of said control signal less than said given plurality of said comparisons to produce a framing error signal;
 fourth means coupled to said third means and at least one of said first and second sources responsive to said framing error signal to adjust the relative timing of said received data and said local timing signals until said first means produces said control signal having said in-frame condition which enables the disabling of said second and third means;
 said second means including:
  a first bistable device coupled to said first means to store the results of the present one of said comparisons, and
  a *j*-stage shift register coupled to a given output of said first bistable device, said shift register having its count advanced by said first bistable device and store therein the results of the j previous ones of said comparison, where j is equal to an integer greater than one; and
 said third means including:
  logical decoder means coupled to said given output of said first bistable device and a predetermined output of each stage of said shift register to produce said framing error signal when said first bistable device and any k stage of said shift register stores simultaneously said out-of-frame condition, where k is an integer equal to or between one and *j*.

2. A circuit according to claim 1, wherein said fourth means includes a second bistable device coupled to the output of said decoder means to control said adjustment of said relative timing.

3. A circuit according to claim 2, wherein:
 said second means further includes an INHIBIT gate having its inhibit input coupled to said first means and its output coupled to said first bistable device;
 said out-of-frame condition being represented by the absence of a signal; and
 said in-frame condition being represented by the presence of a signal.

4. A circuit according to claim 1, wherein said fourth means includes a phase corrector means coupled between said first source and said first means and coupled to the output of said decoder means responsive to said framing error signal to adjust the timing of said received data.

5. A circuit according to claim 4, wherein said fourth means further includes a second bistable device coupled to the output of said decoder means and the control input of said phase corrector to control said adjustment of said timing of said received data.

6. A circuit according to claim 5, wherein:
 said second means further includes an INHIBIT gate having its inhibit input coupled to said first means and its output coupled to said first bistable device;
 said out-of-frame condition being represented by the absence of a signal; and
 said in-frame condition being represented by the presence of a signal.